United States Patent [19]
Sire et al.

[11] Patent Number: 5,780,813
[45] Date of Patent: Jul. 14, 1998

[54] LIGHTER BODY FOR CIGAR LIGHTER, WITH AXIALLY ORIENTED PROTUBERANCESS ALLOWING MOVEMENT OF BIMETALLIC BLADES

[75] Inventors: Jean-Pierre Sire, Mazamet; Gilles Thivet, Labruguiere; Gilles Logeais, Paris, all of France

[73] Assignee: VALEO, Paris, France

[21] Appl. No.: 522,328

[22] PCT Filed: Jan. 12, 1995

[86] PCT No.: PCT/FR95/00037

§ 371 Date: Nov. 2, 1995

§ 102(e) Date: Nov. 2, 1995

[87] PCT Pub. No.: WO95/19273

PCT Pub. Date: Jul. 20, 1995

[30] Foreign Application Priority Data

Jan. 12, 1994 [FR] France ................................ 94 00345
Sep. 2, 1994 [FR] France ................................ 94 10744

[51] Int. Cl.[6] ............................................. B60N 3/14
[52] U.S. Cl. ................................... 219/265; 219/267
[58] Field of Search .......................... 219/240–241, 219/265, 270, 267–268; 439/668

[56] References Cited

U.S. PATENT DOCUMENTS

| 2,151,622 | 3/1939 | Sinko | 219/265 |
| 2,810,814 | 10/1957 | Jorgensen | 219/267 |
| 3,424,414 | 1/1969 | Horwitt |  |
| 3,662,153 | 5/1972 | Barnes, Jr. et al. | 219/265 |
| 3,955,333 | 5/1976 | Fellin | 219/267 |
| 4,293,761 | 10/1981 | Pramaggiore | 219/269 |
| 4,387,292 | 6/1983 | Vitaloni | 219/267 |
| 4,431,904 | 2/1984 | Suzuki | 219/265 |
| 4,549,070 | 10/1985 | Huang | 219/269 |
| 4,713,733 | 12/1987 | Fitz et al. | 219/220 |
| 5,144,111 | 9/1992 | Gaisberg et al. | 219/265 |
| 5,233,162 | 8/1993 | Gaisberg et al. | 219/265 |
| 5,403,996 | 4/1995 | Mattis et al. | 219/265 |

FOREIGN PATENT DOCUMENTS

| 398063 | 11/1990 | European Pat. Off. . |
| 437250 | 7/1991 | European Pat. Off. . |
| 2349796 | 12/1977 | France . |
| 2684053 | 5/1993 | France . |

*Primary Examiner*—John A. Jeffery
*Attorney, Agent, or Firm*—Longacre & White

[57] ABSTRACT

A lighter body (10) having a sleeve (11) carrying, on the inside, a bimetallic device (5) provided with axially oriented blades (51). The sleeve is locally pressed outwards in line with the blades (51) to form axially oriented protuberances forming a space allowing movement of the blades.

12 Claims, 2 Drawing Sheets

LIGHTER BODY FOR CIGAR LIGHTER, WITH AXIALLY ORIENTED PROTUBERANCESS ALLOWING MOVEMENT OF BIMETALLIC BLADES

BACKGROUND OF THE INVENTION

1. Field of the Invention

The present invention concerns lighter bodies for cigar lighters, notably for automobiles.

2. Description of the Prior Art

As is known (FIGS. 1 and 2) a cigar lighter has a lighter body 10, forming a power socket, suitable for being fixed to a fixed wall of the vehicle, for example the fascia 20 of the latter, either directly, or indirectly by means of a conductive light ring 30, referred to as an illuminating ring.

The body 10 is usually mounted in the wall 20 through the front of the said wall (from left to right in FIG. 2), simply by slipping in axially.

A plug 40, forming a power connector, is mounted in the hollow-shaped body 10 and carries at its free end a heating element, usually a heating resistance, housed in a cap 50.

The removable heating plug 40 is held in the body 10, forming a receptacle, in the standby position by means of blades 16 cut from a metal sleeve 11, which forms part of the body 10.

The sleeve 11 carries on the inside a bimetallic device 5 mounted on a bimetallic device carrier made from electrically insulating material. The bimetallic device 5 has blades of overall axial orientation, the free ends of which are shaped as retaining hooks for cooperating with the cap 50.

In the standby position the plug 40 is at a distance from the bimetallic device 5.

In order to light a cigarette, for example, the occupant of the vehicle presses in the movable button 41, which forms part of the plug 40, so that the cap 50 comes into engagement with the blades of the bimetallic device 5.

An electrical circuit is then established, the sleeve 11 bearing on the outside, for this purpose, electrical supply pieces 4, 7 connected to the terminals of the voltage source (usually the battery) of the vehicle.

As soon as the aforementioned heating body reaches the required temperature, the blades of the bimetallic device 5 expand under the effect of the heat, so that the cap 50 of the plug 40 is released.

All that remains to be done then is to extract the plug 40.

The blades of the bimetallic device 5 are therefore allowed to move apart (or open) on the one hand when the button 41 is pushed in and on the other hand after the said plug 40 has been heated.

To this end, large openings 17 are formed in the sleeve 11 in line with the blades of the bimetallic device 5 in order to allow a movement of the said blades and prevent electrical contact between the sleeve 11, usually connected to the vehicle earth, and the bimetallic device 5, usually connected to the positive terminal of the vehicle battery.

Foreign bodies, such as large-sized impurities, dirt or the like may penetrate inside the sleeve 11, through the large openings 17, and disturb, upset or even prevent the operation of the bimetallic device, the adjustment of which is delicate.

The bimetallic device 5 may therefore be incapable of opening sufficiently to release the plug 40 when the latter has reached the required heating temperature. Heating then occurs which is dangerous in particular for the fascia 20 and the ring 30, both made from plastic. A short-circuit between the bimetallic device 5 and sleeve 11 may be established through the impurities.

Another risk may also arise because of the location of the cigar lighter in a position (for example the fascia or instrument panel of the vehicle) where there are many electric cables associated with switches, instruments or other electrical equipment.

An electric cable may therefore touch, notably under the effect of vibration phenomena or impacts, the bimetallic device 5 when still hot and be damaged, resulting in one of the aforementioned items of equipment being put out of service.

In order to mitigate this drawback the idea may be had, for example in the light of the document U.S. Pat. No. 3,424,414, of resorting to an additional protective piece mounted behind the sleeve 11 and closing off the openings 17.

The solution is not satisfactory since it gives rise to higher manufacturing costs and makes it more difficult or even impossible to mount through the front of the wall 20.

In addition this piece increases the size of the lighter body at its end, which may be a hinderance because of the location of other components close to the lighter body.

The object of the present invention is to mitigate these drawbacks and therefore to create, in a simple and economical manner, a novel lighter body which is more reliable and less dangerous, without inordinately increasing its size and whilst preserving ease of mounting thereof from the front.

SUMMARY OF THE INVENTION

According to the invention a cigar lighter of the abovementioned type is characterised in that the sleeve of the lighter body is pressed locally outwards in line with the blades of the bimetallic device in order to form at least one axially oriented protuberance forming a space allowing movement of the blades.

When the lighter body is mounted directly on the associated fixed wall of the vehicle, one protuberance per blade of the bimetallic device is advantageously provided. When mounting is effected by means of an illuminating ring, one protuberance common to all the blades of the bimetallic device can be provided.

By virtue of the invention, only the sleeve is modified in a simple and economical manner by pressing, the other components of the lighter body being unchanged.

The number of components of the lighter body therefore remains unchanged, as is its structure.

The electric cables are protected by the protuberance or protuberances according to the invention forming a protective screen between the bimetallic device and the outside of the sleeve.

Impurities and dirt are therefore not able to penetrate inside the sleeve at this point, so that the adjustment of the bimetallic device is preserved, and the lighter body is more reliable and functions better.

This lighter body is also safer since the risks of overheating are diminished. The risks of short-circuit through foreign bodies are reduced.

In addition the sleeve is stiffened and there is no risk of the blades of the bimetallic device being damaged or disturbed, by virtue of the protuberances, during detrimental manipulations, for example falls, before mounting on the vehicle.

In addition, it is possible to mount the lighter body on the associated fixed wall of the vehicle from the front. This is because, when fixing is effected by means of the illuminating ring the protuberances do not interfere with the mounting since they are shallow, having a height less than the thickness of the said ring. It is then necessary to provide one hollow per protuberance in the illuminating ring, the lighter body being mounted in the ring by slipping the protuberances axially into the hollows in the form of grooves.

In all cases, it is possible to form notches locally in the edge of the passage hole in the fixed wall for fixing the cigar lighter, for the protuberances according to the invention to pass and for mounting from the front with axial slipping in of the sleeve.

The size of the sleeve is slightly increased only locally, which prevents any interference with the other components carried by the said fixed wall at this level.

Other advantages will emerge in the light of the description and the accompanying drawings in which:

DETAILED DESCRIPTION OF THE PREFERRED EMBODIMENT

Figure 3:
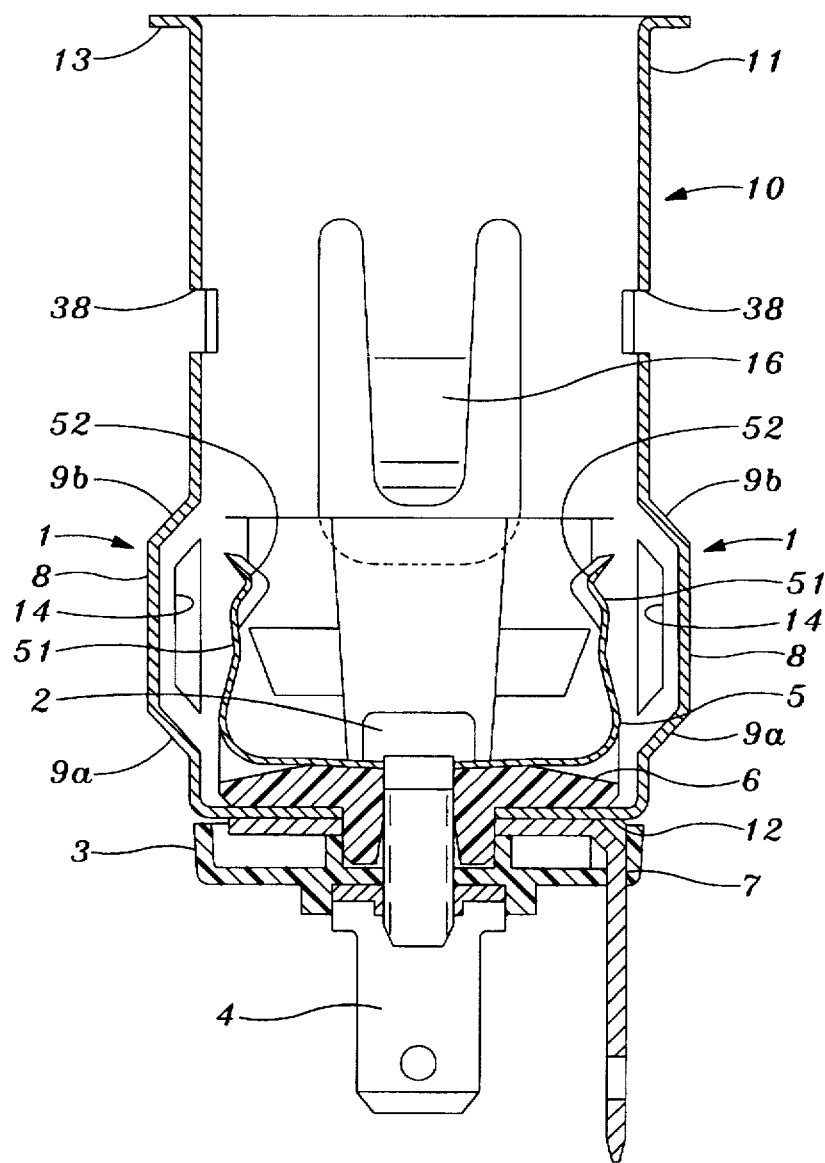
FIG. 3 is a view in axial section of a cigar lighter according to the invention.
Figure 4:
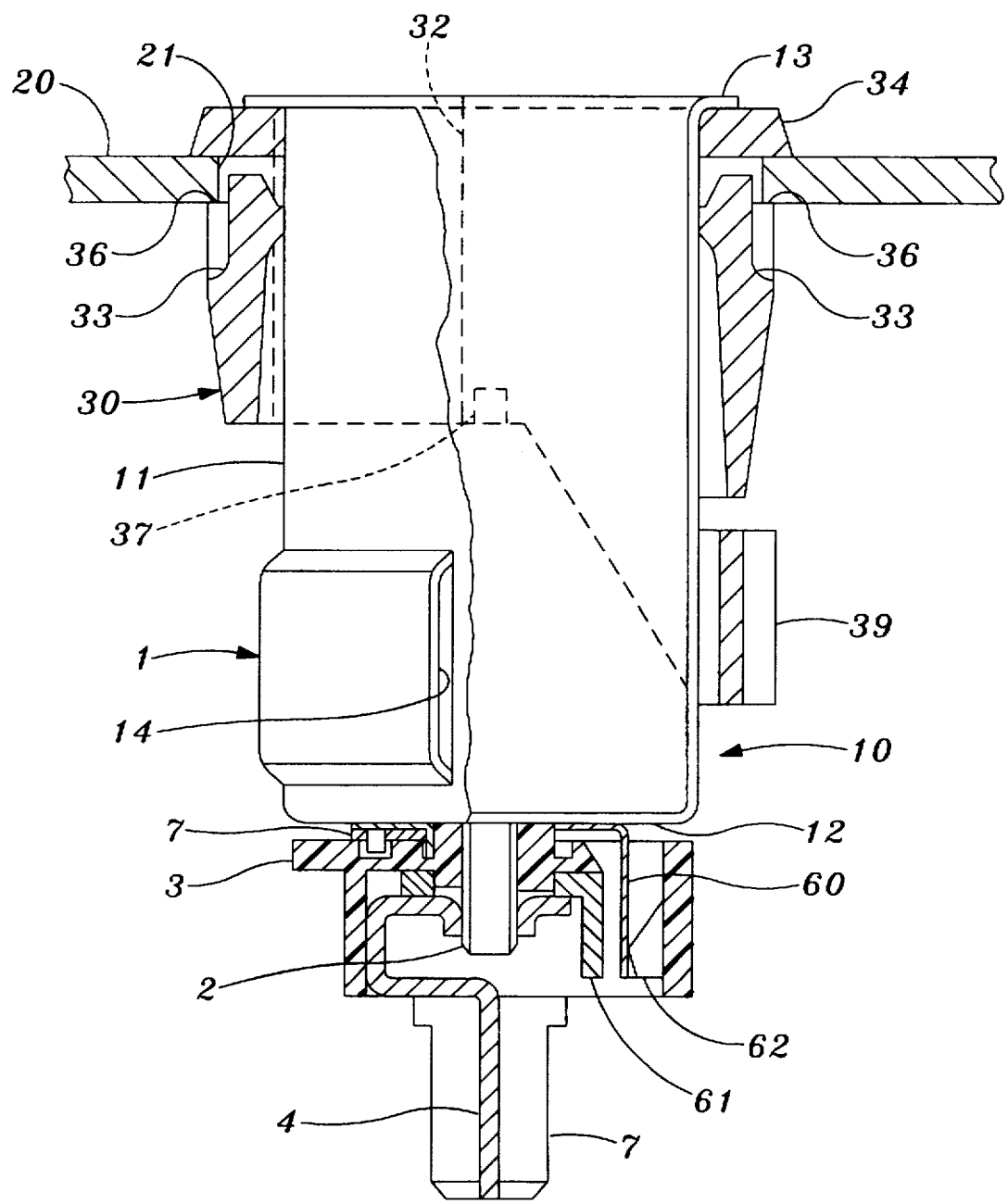
FIG. 4 is a view similar to FIG. 3 of a cigar lighter according to the invention equipped with an illuminating ring.

In FIGS. 3 and 4 the same reference numerals are used for the components common to the invention and to those of the prior art.

Thus, in FIG. 3, the lighter body of a cigar lighter for a automobile can be seen at 10.

Figure 1:
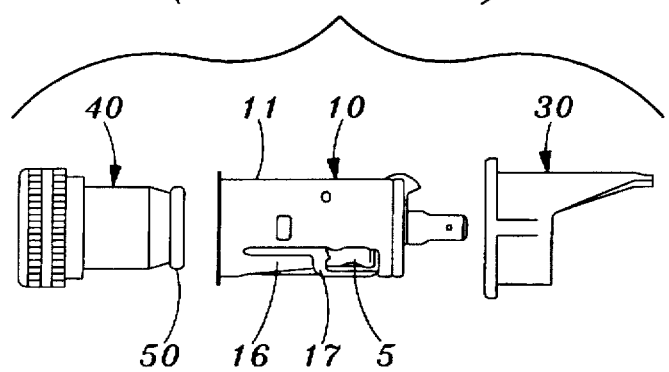
FIG. 1 is an exploded perspective view of a cigar lighter of the prior art.
Figure 2:
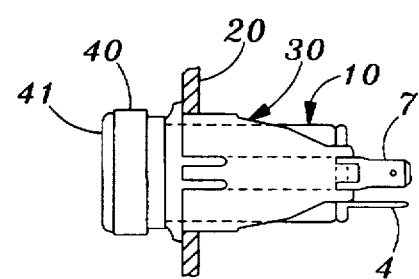
FIG. 2 is a view of the cigar lighter of FIG. 1 mounted on its associated fixed supporting wall.

This body 10 has parts made of electrically conductive material, namely the metal sleeve 11 with, at 16, one of the blades for holding the plug 40 of FIGS. 1 and 2 in the standby position, the electrical supply parts 4, 7, a fixing member 2 and the bimetallic device 5. Here two diametrically opposite blades 16 are provided.

The body 10 also has parts made of electrically insulating material 3, 6, advantageously made from synthetic material such as plastic.

The sleeve 11, cylindrical in shape, is here made from pressed sheet metal and has an end 12 with a central hole for the fixing member 2 and a sleeve of the part 6 forming the bimetallic device carrier to pass.

The bimetallic device 5 and the bimetallic device carrier 6 are mounted inside the sleeve 11, whilst the parts 3, 4, 7 are mounted outside the sleeve 11, which thus bears all the other parts of the lighter body on each side of its end 12.

The bimetallic device carrier 6, also made from thermally insulating material, therefore forms a brace between the end 12 (the internal face of the latter) and the disc-shaped base of the bimetallic device 5, and it is for this reason that the bimetallic device carrier 6 has a convex top face for its local contact with the base of the bimetallic device 5, in this case having two blades 51 of axial orientation overall, each with a free end 52 in the form of a hook for holding the cap 50 of FIG. 1 when the plug 40 is in the heating position. The hooks 52 are directed towards each other, so that a gripper is formed for holding the cap 50.

The bimetallic device 5 therefore has a U-shaped cross section with reduced separation at the hooks 52, with two blades 51 directed towards the open end of the sleeve 11.

The electrical supply part 7 here consists of a right-angled blade, projecting axially, in contact with the end 12 (the external face of the latter) of the sleeve 11.

In this case the blade 7 is suitable for being connected to the negative terminal of the voltage source (the battery) of the vehicle.

The other electrical supply part 4 also consists of a right-angled blade projecting axially. It is suitable for being connected to the positive terminal of the vehicle battery. The insulation piece 3 forms a brace between the horizontal bases of the blades 4, 7 and is overall in the shape of a bowl. In its centre it has, on each side of its bottom, two axial projections, one of which, in the form of a collar, receives on the inside the central sleeve of the bimetallic device carrier 6, and the other one of which forms a runner for mounting the horizontal part of the blade 4 and locking the said blade 4 with respect to rotation through the cooperation of shapes.

The edge of the piece 3 is scalloped locally for the axial part of the blade 7 to pass, the horizontal part of which has two pins (not visible) cooperating with holes (not visible) formed in the end 12.

The pins advantageously engage in hollows in the piece 6 in order to lock the latter with respect to rotation.

Thus the blade 7 is immobilised with respect to rotation through the cooperation of shapes with the end 12. This blade 7 in turn immobilises the piece 3 with respect to rotation by means of its axial end passing through the piece 3 as mentioned previously.

It also immobilises the piece 6 by means of its pins. Naturally the piece 6 can have at least one pin passing through the end 12 and the base of the blade, by means of openings, in order to immobilise the pieces 12, 7 with respect to rotation.

The fixing member 2 consists of a screw, the head of which bears on the base of the bimetallic device 5. This screw 2 passes centrally through the pieces 6, 3, 4 and, by means of its threaded part, screws into the horizontal part, threaded for this purpose, of the blade 4.

Naturally the horizontal part of the blade 7 has a central hole for passage of the central sleeve of the bimetallic device 6 passing through the end 12.

The internal bore of the said sleeve is tapered in shape for the passage of the screw 2, which serves for the fixing and connection of the pieces 5, 6, 7, 3, 4 to the end 12.

According to the invention the sleeve 11 is locally pressed outwards in line with the blades 51 of the bimetallic device 5 in order to form at least one protuberance 1 of axial orientation forming a space allowing movement of the said blades 51.

Here the sleeve 11 has two local projecting protuberances 11 of axial orientation, one per blade 51. These protuberances 1 are diametrically opposite overall. They have a trapezoid-shaped cross section with an end 8 connected axially to the main part of the sleeve 11 by two sloping faces, in this case symmetrical, respectively a lower face 9a close to the end 12 of the sleeve 11 and an upper face 9b at a distance from the end 12.

By means of the sloping faces (or walls), a reduction in the bulk of the protuberances is obtained, the axially oriented end 8 of the protuberances 1 having a length slightly less than that of the blades 51. The lower sloping face 9a of the protuberance 1 is connected axially to the main part of the sleeve 11, overall in the plane of the base of the bimetallic device 5. The upper sloping face 9b of the protuberance 1 is connected to the said main part axially beyond the free end of the blades 51.

This face 9b is connected axially to the end 8 overall in a plane passing through the free ends of the blades 51. The end 8 is therefore offset axially towards the free end of the sleeve 11 with respect to the base of the bimetallic device 5. As a result a maximum amount of space is left clear at the end 12 of the sleeve 11.

In this way an expansion (or dilation) movement of the blades 51 is made possible, the depth or height of the protuberances 1 depending on the applications and is such that, when the plug is heated, the blades 51, in opening, do not come into contact with the end 8, the upper face 9b allowing a movement of the blades 51.

These protuberances 1 therefore mask the blades 51 and constitute a protective screen for them.

For information, it should be stated that, in the heating position of the plug, an electrical circuit is established, the electric current passing through the blade 4, the screw 2, the bimetallic device 5, the cap 50 (FIG. 1), the tubular part of the plug 40, the sleeve 11 and the blade 7.

It will be noted that the end 8 is situated on a diameter which is equal overall to (slightly less than) the external diameter of the collar 13, which the metal sleeve 11 has at its free end.

Where the body 10 is fixed directly to the wall 20 of FIG. 2, notches are provided in the hole 21 in the wall 20 at the rate of one notch per protuberance 1 for the body 10 to be mounted from the front and slipped axially into the said hole. Where the body 10 is mounted on the wall 20 by means of an illuminating ring, hollows 32, at the rate of one hollow per protuberance, are provided in the said ring 30 (FIG. 4) for the body 10 to be mounted by axially slipping into its ring 30, the said body 10 opening out at the collar of the said ring 30.

The protuberances 1 are in fact not very high, in practice less than the thickness of the ring 30.

For information, it should be stated that the ring 30 has half-cropped projecting blades 33, in this case two diametrically opposite blades, and an end collar 34.

The axially oriented blades 33 are notched to form at least one shoulder 36 designed to come into engagement with the wall 20.

When the cigar lighter is mounted, first of all the ring 30 is slipped from the front into the opening 21 in the wall 20. During this operation the blades 33 retract by contracting inwards when passing through the hole 20, and then expand after passing through the hole. Thus, after the ring is fitted, the wall 20 is sandwiched between the collar 34 and the shoulders 36 of the blades 33.

Afterwards the sleeve 11 is inserted into the ring 30 by slipping the protuberances 1 into the axially oriented hollows 32.

In a manner known per se, the ring 30 has catches 37 each designed to enter a complementary opening 38 in the sleeve 11 (FIG. 3) for fixing the sleeve 11 with the parts which it carries, notably the blades 4, 7, to the ring 30, itself fixed as stated above to the wall 20. Here the ring 30 partly surrounds the sleeve 11 and has a lug 39 for mounting a light source.

In this case the protuberances 1 are visible (FIG. 4), the ring 30 being shorter t ha n the sleeve 11.

It will be noted that the hollows 32, here in the form of axial grooves, make it possible to orient the sleeve in the correct direction, because the protuberances are slipped axially into the hollows 32. Thus the catches 37 will enter the openings 38 without fail, so that a locating means is created.

As a variant, if it is not wished to reduce the thickness of the ring 30 excessively, protuberances can be provided on the ring, forming a space for mounting the protuberances of the lighter body. In this case, notches must be provided in the hole 21 in the wall 20 for the protuberances on the ring 30 to pass.

Naturally the present invention is not limited to the example embodiment described. In particular, the fixing member 2 can consist of a rivet.

The piece 3 can form the male part of a connector comprising the blades 4, 7.

The protuberances 1 can include the axially oriented end 8 as in FIG. 3, being connected to the main part of the sleeve 11 by rounded parts. The faces of the protuberance 1 can be non-symmetrical. The end 8 can be convex.

It is possible to increase the size of the protuberances both axially and circumferentially when the environment in which the lighter body is mounted so allows.

It is possible to modify the shape of the bimetallic device, notably at the area where the blades 51 are connected to the base of the bimetallic device, having regard to the space left clear by the protuberances 1.

The number of protuberances depends on the number of blades 51, some bimetallic devices having three or four blades 51.

In the case of fixing by means of the illuminating ring, the latter can be hollowed out internally for mounting a single protuberances common to all the blades. Naturally the thickness of the ring and of the associated hole in the wall 20 can also be increased when this is possible having regard to the environment.

It will be noted that the slot associated with the blade 16 is not an impediment since normally it is masked by the cigar lighter plug and that the bimetallic device 5 can include, in a manner known per se, at least one safety blade, suitable for coming into contact with the sleeve 11 in the event of overheating.

As a variant, FIG. 4, the safety blade 60, in the shape of a right angle, can be interposed between the end 12 of the sleeve and the power supply blade 7 and come into contact with a piece 61 electrically connected to the blade 4 in order to establish a short-circuit in the event of overheating. The piece 3 is then modified and has a corner 62 for supporting the safety blade 60, of axial orientation, and defining a precise gap between the blade 60 and the piece 61 jammed between the blade 4 and the piece 3.

Naturally the protuberances 1 have a width which is preferably slightly greater than that of the blades 51 of the bimetallic device.

In FIG. 3 the end 8 is connected circumferentially to the main part of the sleeve 11 by two walls (or faces) 9a, 9b laterally revealing slots 14, the end 8 having a width greater than that of the blades 51. These slots 14, in this case trapezoidal in shape, have a size less than that of the slots 17 in FIG. 1 so that they prevent the entry of impurities and prevent the electric cable from coming into contact with the bimetallic device. In addition they advantageously allow ventilation.

Naturally the protuberances may have a closed contour and, in this case, at least one small ventilation hole is provided on the sleeve at 90° with respect to the protuberance 1.

This ventilation can also be achieved by increasing the size of the slot associated with each blade 16, offset circumferentially, in this case at 90°, with respect to the protuberances 1 and blades 51 so as not to interfere with the latter. These blades 16 are obtained by cropping.

We claim:

1. A Lighter body for a cigar lighter comprising: a metal sleeve (11) having an open end for reception of a moveable plug, said metal sleeve (11) carrying on the inside a bimetallic device (5) provided with a base and blades (51) directed towards the open end of the metal sleeve (11) wherein said sleeve (11) is locally pressed outwards in line with the blades (51) of the bimetallic device (5) to form at least one axially oriented protuberance (1) forming a space allowing movement of the blades (51).

2. The Lighter body according to claim 1, wherein the protuberance (1) has an end (8) of axial orientation.

3. The Lighter body according to claim 2, wherein the end (8) has a length less than that of the blades (51) of the bimetallic device (5).

4. The Lighter body according to claim 1, wherein the width of the protuberance (1) is greater than the width of the blade (51) of the bimetallic device (5).

5. The Lighter body according to claim 1, wherein one protuberance (1) per blade (51) of the bimetallic device (5) is provided.

6. The Lighter body according to claim 5, wherein the metal sleeve (11) is slipped into an illuminating ring (30) having one hollow (32) per protuberance (1) and in the protuberances (1) has a height less than the thickness of the ring (30).

7. The Lighter body according to claim 1, wherein the metal sleeve (11) has at least one blade (16) for holding a removable heating plug (40), said blade (16) being offset circumferentially with respect to the protuberances (1).

8. A Lighter body for a cigar lighter comprising: a metal sleeve (11) having an open end for reception of a moveable plug, said metal sleeve (11) carrying on the inside a bimetallic device (5) provided with a base and blades (51) directed towards the open end of the metal sleeve (11), wherein said sleeve (11) is locally pressed outwards in line with the blades (51) of the bimetallic device (5) to form at least one axially oriented protuberance (1) forming a space allowing movement of the blades (51), the protuberance (1) has an end (8) of axial orientation and the end (8) of the protuberance (1) is connected axially to the main part of the sleeve (11) by first and second sloping faces (9a, 9b).

9. The Lighter body according to claim 8, wherein the protuberance has a trapezoid-shaped cross section.

10. The Lighter body according to claim 8, wherein the first sloping face (9a) is connected axially to the sleeve (11) overall in the plane of the base of the bimetallic device (5).

11. The Lighter body according to claim 8, wherein the second sloping face (9b) is connected to the sleeve (11) axially beyond a free end of the blades (51) of the bimetallic device (5).

12. The Lighter body according to claim 11, wherein the second sloping face (9b) is connected axially to the end (8) of the protuberance (1) behind the blades (51) of the bimetallic device (5).

* * * * *